W. H. FAUBER.
AEROPLANE.
APPLICATION FILED OCT. 24, 1908.

971,030.

Patented Sept. 27, 1910.
6 SHEETS—SHEET 4.

Witnesses:
T. W. Alfeds
G. R. Wilkins

Inventor
William H. Fauber
by Poole + Brown
Attys

W. H. FAUBER.
AEROPLANE.
APPLICATION FILED OCT. 24, 1908.

971,030.

Patented Sept. 27, 1910.
6 SHEETS—SHEET 6.

Inventor
William H. Fauber
by Poole + Brown
Attys.

Witnesses:
T. H. Alfred
G. R. Wilkins

UNITED STATES PATENT OFFICE.

WILLIAM H. FAUBER, OF NANTERRE, FRANCE.

AEROPLANE.

971,030.

Specification of Letters Patent. Patented Sept. 27, 1910.

Application filed October 24, 1908. Serial No. 459,364.

*To all whom it may concern:*

Be it known that I, WILLIAM H. FAUBER, a citizen of the United States, and a resident of Nanterre, France, have invented certain new and useful Improvements in Aeroplanes; and I do hereby declare that the following is a full, clear, and exact description thereof, reference being had to the accompanying drawings, and to the letters of reference marked thereon, which form a part of this specification.

This invention relates to apparatus for aerial navigation of the general class known as aeroplanes, and it has for its object the production of an apparatus of the kind stated, which is adapted to be safely, certainly and easily controlled in operation.

An apparatus is shown in the accompanying drawings, which embodies a preferred form of my invention, and which embraces a light and strong horizontally disposed frame-work to which are applied aeroplane or supporting members, in the nature of sails or wings, and which are made of sheet material, such, for instance, as oiled silk or other strong light fabric. Beneath such frame-work is suspended a lower frame-work carrying a propeller and a motor for actuating the same. The said aeroplane members include laterally arranged members disposed substantially in a horizontal position and arched members arranged centrally along the longitudinal axis of the apparatus and above the level of said lateral aeroplane members. Both the lateral aeroplane members and the central arched supporting members are divided into transversely extending sections arranged in shelving relation, or with the forward edge of each member except the forward one, above the level of the rear edge of the member immediately in advance of it. Each aeroplane member is downwardly and rearwardly curved at its rear part, and has its greatest curvature at its rear end; the action of each section being such that the front edge thereof encounters the air at a slight angle and the downwardly curved rear portion acts upon the air with increasing effect as the air beneath it is set in motion, thereby affording enhanced lifting effect in proportion to the power applied to give forward movement to the apparatus. Rudders are provided for controlling the vertical and horizontal movements of the apparatus, which embrace novel features of construction and arrangement, as will hereinafter appear.

The invention may be better understood by reference to the accompanying drawings in which:—

First referring to the form of apparatus shown in Figs. 1 to 4 inclusive, 1, 1 indicate forward and 2, 2 indicate rear, laterally extending, substantially horizontal supporting planes or aeroplane members. Said aeroplane members are separated laterally from each other by a space of considerable width along the longitudinal center of the apparatus.

3 and 4 indicate two central, longitudinally arranged supporting members, which fill the space between the lateral supporting members 1, 1 and 2, 2 and extend above the level of said lateral supporting members, the same being, as shown in the drawings, made of flexible material and of arched form.

5 indicates a horizontal rudder located at the rear end of the apparatus and which is of triangular form with its pointed end directed to the rear.

6 indicates a vertical steering rudder which is located below the level of the lateral aeroplane members and forward of the rudder 5.

7 indicates a forward, vertically arranged balancing member or center sail which is located on the central longitudinal line of the apparatus and extends downwardly from the level of the lateral aeroplane members, the same being of triangular form. 8 indicates a like vertical center sail arranged in line with and extending rearwardly from the forward sail 7, and preferably terminating adjacent to the forward end of the rudder 6.

Now, referring to the construction of the horizontally disposed frame-work to which is applied the fabric or sheet material which forms the lateral aeroplane members 1, 1 and 2, 2, the central supporting members 3 and 4 and the horizontal rudder 5, said frame-work embraces the following members: 9, 9 indicate longitudinal, parallel frame members and 10, 11, 12, 13 and 14 transverse frame members, which latter extend between and rigidly connect said longitudinal frame members and constitute therewith an open rectangular frame. Said longitudinal and transverse frame members may be made of light tubing, bamboo or the like, and are rigidly connected with each other. Rigidly attached to and extending outwardly from the longitudinal frame members 9, 9, are transverse frame members 15, 15 which, as shown, are arranged in alinement with and constitute outward extensions of the central transverse frame member 12. The ends of the laterally extending frame members 15, 15 are connected by tension members 16, consisting of wires, cords or cables, with the forward and rear ends of the longitudinal frame members 9, 9.

The forward and rear lateral aeroplane members 1 and 2, at each side of the apparatus consist of flexible sheet material or fabric, and are of triangular form. Said members 1 and 2 are connected at their inner margins with the longitudinal frame members 9, 9 and the outer angles of said supporting members are attached to the outer ends of the outwardly extending frame members 15, 15. The side margins of the central arched supporting members 3 and 4 which are made of canvas, silk or light flexible sheet material, are secured at their side edges to said longitudinal frame members 9, 9 and are of such construction and width that each of them will assume the form of an arch when distended upwardly, as occurs when the apparatus is in motion or supported in the air, but may collapse and rest upon the frame work when the apparatus is at rest or not in use. As illustrated, the side margins of the forward arched supporting members extend from the forward ends of said longitudinal frame members 9, 9 to the central transverse frame member 12, while the side margins of the rear arched member 4 are connected with the rear parts of said longitudinal frame members and extend along the same from the said transverse frame member 12 to the rear transverse frame member 14; the rear end of the forward member 3 being separated from the forward end of the rear member 4 by a space or gap, as clearly seen in Fig. 2.

The horizontal rudder 5 is connected at its forward margin with the rear-transverse frame member 14 and extends rearwardly therefrom. Said horizontal rudder consists of a central, longitudinal flexible rib or rod 17, which is rigidly connected at its forward end with the frame, and a triangular piece of flexible material attached at its forward edge to the frame member 14 and along its center to the rib 17. As illustrated, the flexible rib 17 is attached to the said transverse frame member 14 and extends forward to and is connected with the transverse frame member 13.

The lower frame work of the apparatus is constructed as follows: 18 indicates a central, lower, longitudinal keel, member which is located at a considerable distance below the upper horizontal frame work and is connected with the longitudinal members 9, 9 of said frame work by means of three pairs of oblique frame members, the forward oblique members being marked 19, 19, the intermediate members 20, 20, and the rear members 21, 21. The upper ends of said oblique frame members are attached to the said longitudinal frame members 9, 9 at the point of attachment thereto of the three intermediate transverse frame members 11, 12 and 13, above referred to. The forward oblique frame members 19, 19 constitute with the frame member 11, a transversely arranged triangular frame. Likewise the intermediate oblique frame members 20, 20 and the rear triangular frame members 21, 21 form with the transverse frame members 12 and 13, similar triangular frames. The said lower frame-work is stiffened by means of oblique tension members, 22, 22, which extend diagonally between the upper and lower ends of the forward and rear oblique members 19 and 21, as clearly seen in Fig. 2.

Figure 3:
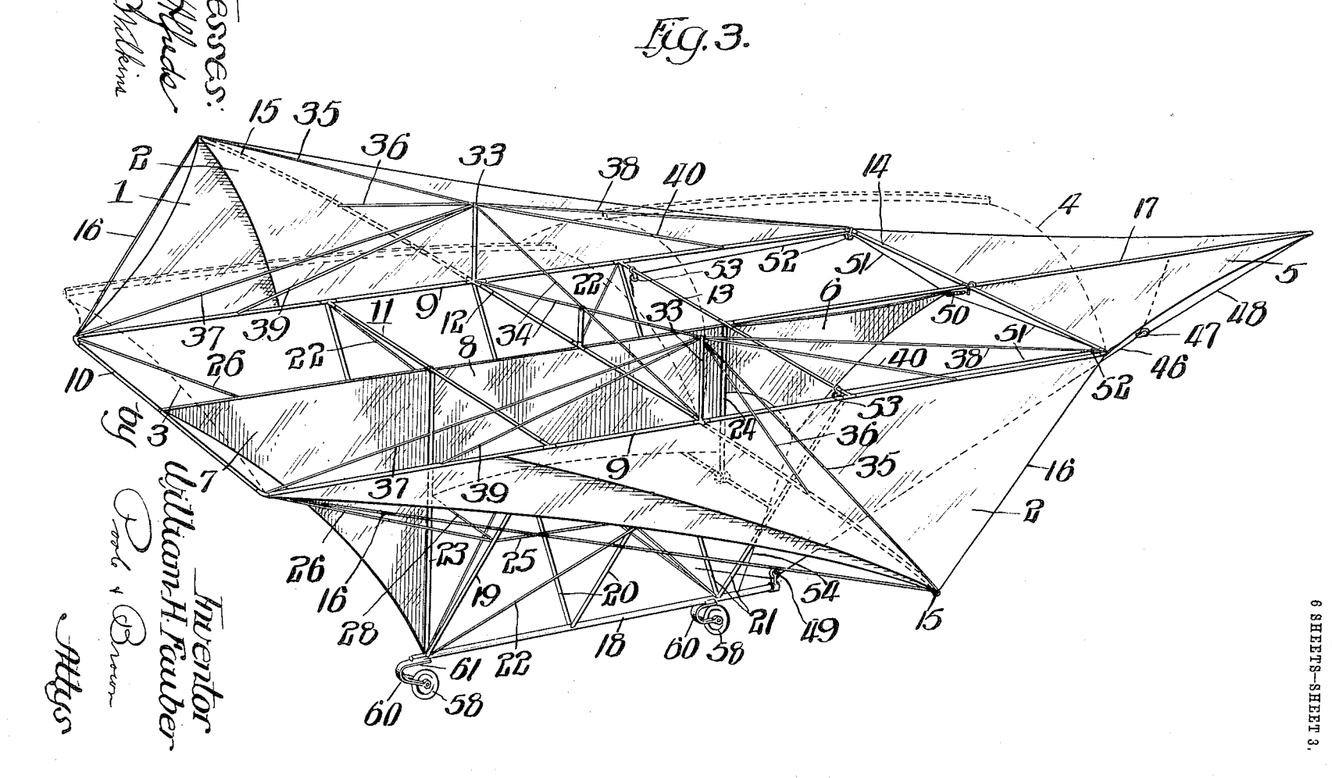
Fig. 3 is a perspective view of the apparatus, with the central, arched supporting members shown in dotted lines.

The forward triangular center sail 7, as clearly seen in Fig. 3, is connected at its forward angle to the center of the forward transverse frame member 10 and at its upright rear edge to a vertical rod or wire 23 which extends downwardly from the center of the transverse frame member 11 to the keel. The rear sail member 8 is connected at its forward edge to said wire 23, while its rear vertical margin is attached to an upright wire or cord 24 extending from the center of the transverse frame member 13 downwardly to the lower frame-work. The forward margin of the vertical steering rudder 6 is also attached to said wire or cord 24.

As a further means of bracing or holding in shape the entire frame-work of the apparatus, tension members or wires 25 (Fig. 2) extend horizontally between the oblique frame members 19 and 21, and other wires 26 and 27 extend from the ends of said wires 25 in an upwardly inclined direction to the forward and rear ends of the longitudinal frame members 9, 9. A horizontal, transverse tension member 28 extends between the central parts of the intermediate oblique frame members 20, 20 (Fig. 4) and from the ends of said tension member 28 inclined tension members 29 and 30 extend upwardly and outwardly and are connected with the lateral projecting frame members 15 at the outer ends and middle portions of the same. Other inclined tie rods or wires 31 and 32 extend from the intersection of the horizontal tension members 25 with the frame members 20, forwardly and rearwardly to the longitudinal frame members 9, and are connected with the latter at points between the inclined frame members 19 and 21, and the forward and rear ends of said longitudinal members. In connection with said tension members 26, 27, 29, 30, 31 and 32 upright posts or struts 33, 33 rise from the longitudinal frame members 9, 9 at the intersection of the frame member 12 therewith, and from the upper ends of each of said struts, rods or wires 34 extend to the lower ends of the opposite struts, other rods or wires 35 and 36 extend outwardly to the extremities of the transverse frame members 15 and to the central parts of the latter, and other rods or wires 37, 38, 39 and 40, Fig. 2, extend in a direction fore and aft of the apparatus from the upper ends of said upright struts 31 to the forward and rear ends of the longitudinal frame members 9 and to points on said longitudinal frame members at which the wires 31 and 32 are connected therewith.

Now, referring to the means illustrated for propelling the apparatus, 41 indicates a propeller, consisting of two obliquely arranged blades which extend outwardly from a horizontal propeller shaft 42 located in the central longitudinal plane of the machine below the level of the main horizontal frame work and of the lateral aeroplane members 1 and 2 thereon. The said propeller is located at the rear of the rearmost oblique frame members 21, 21 of the lower frame-work, and the propeller shaft is mountel on the said lower frame-work at a point between the bottom and top of the said frame-work and at such distances above the keel member 18 that the propeller is entirely above said keel member.

43 indicates a motor with which the propeller shaft 42 is directly connected; said motor being mounted on the lower frame-work near the longitudinal center thereof. This location of the propeller described brings the same only a short distance rearward of the longitudinal center of the apparatus and well forward of the horizontal rudder 5.

Figures 4, 6:
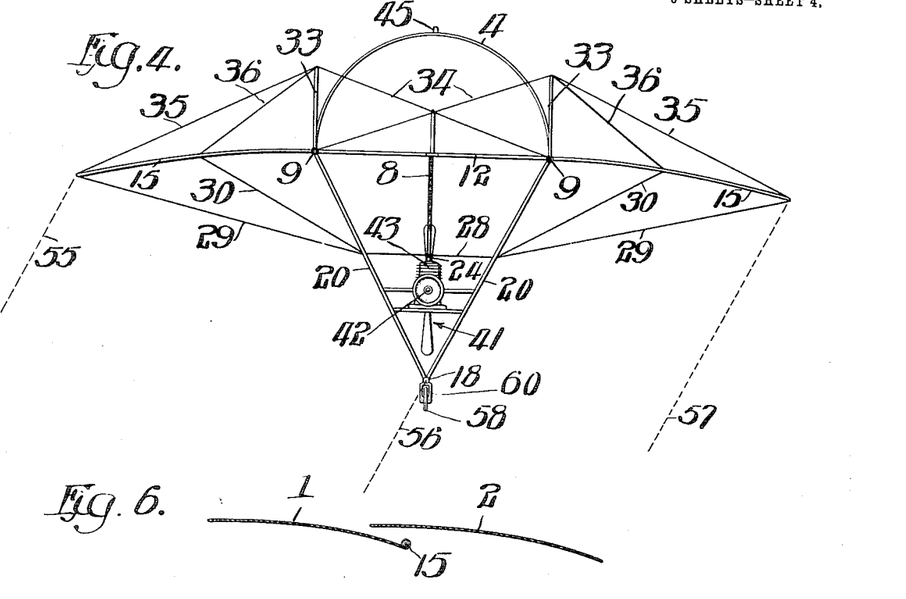
Fig. 4 is a transverse section taken on the line 4—4 of Fig. 2.
Fig. 6 is a detail section through the lateral supporting members of the apparatus taken on line 6—6 of Fig. 1.

Now, referring to the special arrangement with respect to each other of the lateral aeroplane sections 1 and 2, and of the central arched supporting members 3 and 4, these parts are arranged and applied to the frame-work of the apparatus as follows: The forward section 1 has its rear margin below and separate from the forward margin of the rear member 2 and said rear margin of the forward member is secured to the lower face of the laterally projecting frame member 15, in the manner indicated in the detail section, Fig. 6. The said forward margin of the rear member 2 is preferably, but not necessarily, arranged in overlapping relation to the rear portion of the forward member 1, as shown; said forward margin of the member 2 being inclined forwardly and inwardly from the outer angle thereof and attached to the longitudinal frame member 9 at a point considerably forward of the transverse frame member 15. Whether the said forward edge of the rear member 2 be arranged to overlap the forward members 1, or not, said forward edge of the rear member, by reason of the flexible character of the sheet material of which the aeroplane members are composed, takes the form of an upward curve between the frame member 9 and the outer end of the transverse frame member 15, so as to permit the entrance of air beneath the said forward margin of said rear member. Moreover, the rear margin of the forward member 1, being attached to the said transverse frame member 15, is held from rising under upward air pressure, while the forward oblique margin of said forward member 1, rises or bows upwardly under such upward air pressure. It follows that said forward member assumes the form shown in Fig. 6, the same curving downwardly and rearwardly in its rear part and having the greatest curvature near its rear margin, where it is attached to the transverse frame member 15. Similarly, in the case of the rear aeroplane member 2, the forward edge thereof, being curved upwardly by the air pressure beneath it, rises above the downwardly inclined rear portion of the forward member 1, and, having its rear inclined margin held substantially in a horizontal plane by the wire or tension member 16 to which it is attached, similarly assume a downwardly curved form from front to rear, as shown in Fig. 6, with the greatest curvature adjacent to said rear margin. As a result of the downward curvature of the aeroplane member, a superior lifting effect is produced as compared with that afforded by a plane surface. This is due to the fact that the forward margins of such a downwardly curved aeroplane member acts upon the air at an angle, thereby producing a downward pressure upon and downward movement of the air, beneath and in immediate contact therewith. If the aeroplane member had the form of a perfectly flat inclined plane, the sustaining power due to the entire surface of the member would not be utilized because the air which has imparted to it a downward movement by the forward portion of the member, will exercise substantially no upward pressure on the rear part of the member. If, however, the member be inclined downwardly at its rear portion, with gradually increasing curvature, said member will continue to act or press downwardly on the air in its forward movement, because, while the air beneath the member will be deflected downwardly to some extent by the action of the forward portion of said member, the downwardly curved rear portion thereof will continue to act upon the air, by reason of the fact that the constantly increasing downwardly deflection of the supporting member will serve to compensate for the downward direction given to the air by the forward portion of the member. In other words, the increasing downward curvature of the aeroplane member follows the air as the motion of the latter is acceleratel, thereby giving substantially uniform downward pressure of all parts of the aeroplane member on the air and maximum sustaining power to the member as a whole.

In the construction illustrated, wherein the aeroplane members 1 and 2 are made of flexible material and are attached at their rear edges in one case to the transverse frame member 15, and in the other case to the oblique wire or tension member 16, the forward edges of said members are permitted to rise above the rear edges thereof, under the upward pressure of the air, by reason of the looseness of said forward edges, which are not drawn taut between their points of connection with the framework. This construction has the advantage of facilitating the adjustment of said aeroplane members so that the best results can be obtained. It also has the advantage that the flexible material need not be drawn tight across the frame work and the latter is relieved from strains which would be produced by placing the material under tension.

The arched, central, supporting members 3 and 4 are arranged generally in the same relation to each other as the lateral aeroplane members 1 and 2. That is to say, the forward edge of the rear member 4 is higher than the adjacent rear edge of the forward member 3, and the upper parts of said members 3 and 4 are downwardly and rearwardly curved. This form of the said members 3 and 4 is produced by reducing the width of the sheet material of which said sections 3 and 4 are formed, gradually from the front toward the rear, in such a manner as to produce a curved form in the tops of the arched members and a gradually increasing curvature at the rear portions of said members, as clearly seen in Fig. 2. The forward arched supporting member 3 is shown as having a forwardly extending point or peak, and said members 3 and 4 are shown as provided with central, longitudinal, stiffening ribs 44 and 45, which are downwardly and rearwardly curved to correspond with the curvature of the tops of said members.

Now, referring to the construction of the horizontal rudder 5, the same as before stated, is formed of a triangular piece of flexible material, attached to a central, flexible, longitudinal rod 17. The purpose of the flexible construction in said rudder is to enable its rear end to be bent or curved downwardly to a greater or less extent, so that it will act on the air beneath it to a greater or less degree in a manner to lift or depress the forward end of the apparatus. The means shown for so bending downwardly the rear end of said rudder 5 consists of a cord 46, extending from the rear end of the rib 17 downwardly to the lower framework. Said cord 46 may be adjusted by hand or by any suitable operating mechanism to give any desired downward curvature or inclination to the rear part of the rudder. As illustrated, the cord 46 has at its rear end a pulley 47 around which passes a cord 48 the ends of which are attached at two separate points to the rod or backbone 17, thereby distributing the strain of the cord 46 to separate points on the said rod 17. Said cord 46 is shown as passing at its forward end around a pulley 49 attached to the keel member 18. Said horizontal rudder 5 performs the function of a rudder to change the longitudinal inclination of the apparatus or direct it upwardly or downwardly, and at the same time acts as a supporting surface or aeroplane member.

By reason of the location of the motor substantially at the center of the apparatus, both transversely and longitudinally, and at some distance below the aeroplane members, the apparatus will be approximately self-balancing in case the propeller ceases to operate and a parachute descent is to be effected. The propeller being located considerably below a line passing through the center of resistance to the forward movement of the aeroplane members, the thrust of said propeller will manifestly tend to lift the forward and depress the rear end of the apparatus, but any such effect is counteracted or resisted by the lifting force of the downwardly inclined or curved rear end of the horizontal rudder 5. The propeller 41 is so located with respect to the rear end of the rudder and at such distance below the rudder, that the rearwardly moving current of air set in motion by the propeller acts upwardly on the said rudder. The effectiveness of the lifting force of said rudder is augmented and its capacity to counteract the lifting effect of the thrust in the propeller on the forward end of the apparatus, by the action of such rearwardly moving current of air on the downwardly bent rear end of said rudder, and such lifting effect of the rudder may be made effective to a greater or less extent, as desired, according to the extent of downward curvature given to its rear end by the cord 46. I deem it desirable that the motor should be located at a relatively low point on the frame-work, for the reason that its weight acting at a point considerably below the aeroplane members, adds greatly to the stability of the apparatus. By placing the propeller shaft at the level of the motor it becomes possible to connect said shaft direct to the motor shaft, thereby greatly simplifying the construction. By the employment of the horizontal rudder 5, located at a considerable distance rearward of the propeller, and at such distance above the level of the same that, when the said rudder is bent downwardly it is acted upon by the rearwardly moving air current from the propeller it becomes practicable to so locate the motor and propeller, because it becomes thereby possible to utilize the action of such air current on the lower surface of the rudder as a means of counteracting the tendency of the propeller to lift the forward end of the apparatus. It is to be noted in this connection that the vertical distance between the center of resistance to the forward movement of the aeroplane members and the line of thrust of the propeller is much less than the distance from the center of gravity of the apparatus to the rear end of the horizontal rudder 5, and it follows that the rudder operates with enhanced effect or leverage to swing the apparatus about its center of gravity in resisting the tendency of the propeller to swing or turn the apparatus on its said center of gravity in the opposite direction or in a direction to lift the front end of the apparatus.

The vertical rudder 6, by which the course of the apparatus is controlled, embraces novel features of construction as follows: Said rudder consists of a piece of flexible material in the nature of triangular sail, the upright forward edge of which is attached to the upright wire or rod 23 as hereinbefore stated. The peak or point at the rear end of said rudder 6 is connected with the center of the transverse frame member 14 by an elastic member 50, shown as having the form of a contractile coiled spring, but which may consist of an elastic cord or the like. Said elastic member 50 tends to keep the upper edge of the rudder stretched taut and the rudder in line with the longitudinal center of the apparatus. For giving lateral movement to the rear end of said vertical rudder 6, steering ropes 51, 51 are attached to the rear point or peak of the same, and extend laterally to the sides of the horizontal frame work, where they pass around guide pulleys 52 and thence forward to other guide pulleys 53, from which they lead downwardly to points on the lower framework within reach of the operator. The rear end of the rudder may be drawn either to the right or left by pulling in one of the steering ropes and letting out the other one; the elastic member 50 stretching to permit the lateral movement of the said rear end of the rudder, as clearly indicated in Fig. 1. Aside from the advantage of lightness gained by the sail-like rudder 6 described, a frame-work or backbone for said rudder being unnecessary, such a rudder in action assumes a gradually increasing curvature from front to rear, thereby affording the same advantages in effectiveness of action as set forth in connection with the curved form of aeroplane members and in connection with the flexible horizontal rudder. By reason of the presence of the propeller immediately below the rudder 6, the vertical width of the forward end thereof is limited, and in order to give increased size to said rudder it has a downwardly projecting point at the rear of the propeller to which point is attached a cord 54, which extends downwardly to the lower part of the framework and holds taut the forward portion of said rudder.

The vertically arranged balancing or center sails 7 and 8 are found to add greatly to the stability of the apparatus. Assuming, for instance, that the apparatus has been tipped or inclined to one side until the dotted lines 55, 56, 57, shown in Fig. 4, represent upright or vertical lines, it will be noted that the distance from the central line 56 to the line 55, which passes through the outer ends of the left hand aeroplane members, this being the lowermost side of the apparatus when inclined, is very much greater than that between the corresponding lines 56 and 57 at the right hand side of the apparatus, and as the center of gravity of the apparatus is located very near the central line 56 and as the action of gravity is on a vertical line, regardless of the angle to which the apparatus may be tilted, it follows that the air which is confined or pocketed between the left hand aeroplane members and the center sails 7 and 8, will act upwardly on the said left hand aeroplane members and the tendency of the upward air pressure will be to lift the lower side of the apparatus and thereby restore the same to its horizontal position. The said center sails also tend, by their action on the air, to prevent the upper part of the apparatus from oscillating from side to side about a longitudinal line passing through its center of gravity, and thereby decrease lateral oscillation and add to the stability of the apparatus.

Another feature of my invention consists in supporting wheels 58 which are mounted at the center line of the frame-work below the longitudinal keel member 18, in position for contact with the ground in the descent of the apparatus. As shown, said wheels are two in number, of small diameter and located at opposite ends of the keel member 18. Said wheels are provided with pneumatic tires 59 of relatively large cross section and are mounted on the lower, horizontal ends of U-shaped spring arms 60, the upper horizontal ends of which are attached to the keel member 18. The said keel member is provided with downwardly facing surfaces 61 above the wheels, against which the latter strike or bear when pressed toward the frame. The said spring arms are shown as made duplex in structure, consisting of two parallel members between which the wheels are located, and the downwardly facing surfaces 61 are shown as formed by the flat, upper, horizontal parts of said spring arms. Said spring arms 60 serve to afford an elastic connection between the wheel and the frame-work, and are sufficiently stiff or rigid to carry the weight of the apparatus when resting upon the ground, but when the apparatus strikes the ground in its descent with dangerous force, the spring arms yield to permit the tops of the pneumatic tires to come in contact with the downwardly facing surface 61 so that the shock or jar so produced is taken up or cushioned by said tire which is compressed between the wheel and the ground and also between the wheel and the frame-work. The wheels thus constructed and mounted are relieved from extreme shocks or jars, thereby avoiding the necessity of a heavy construction in said wheels.

Figure 1:
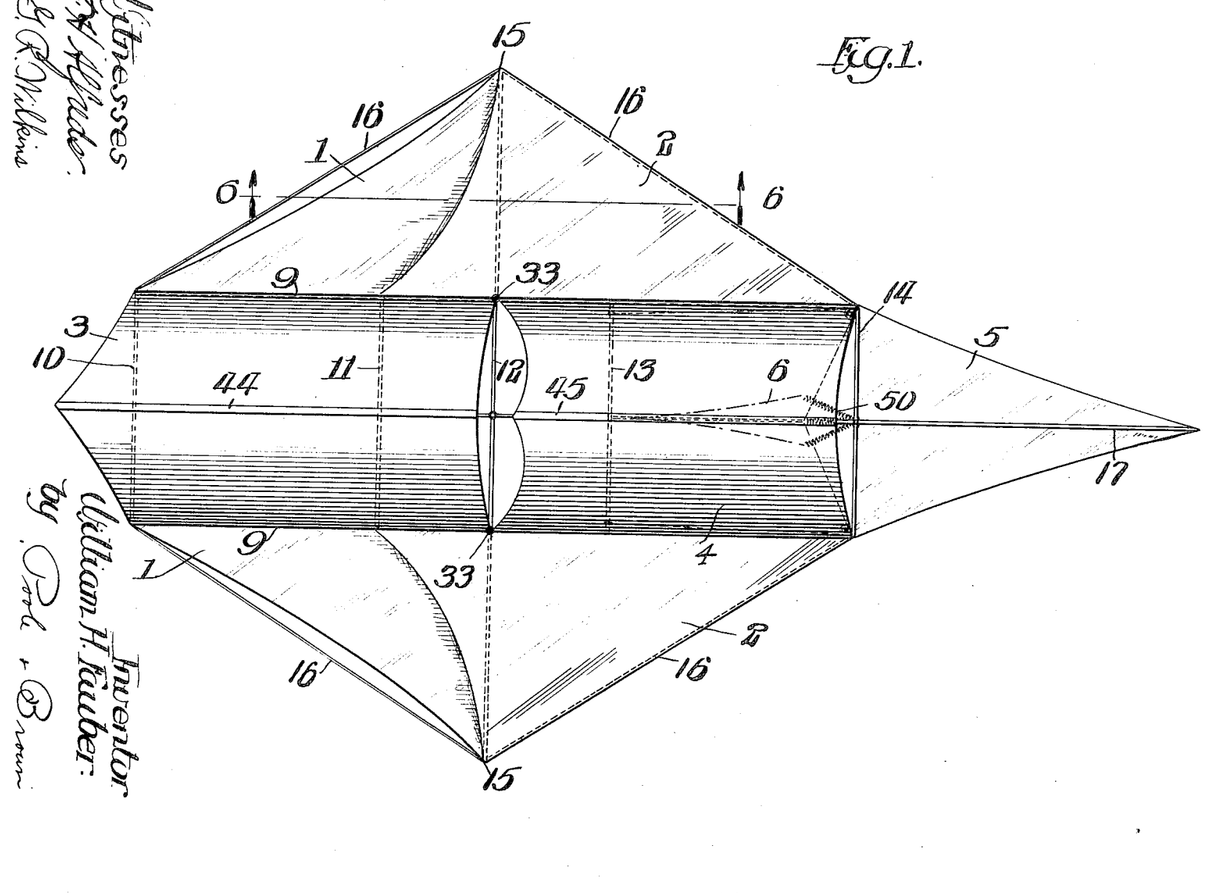
Figure 1 is a top plan view of the apparatus.
Figure 2:
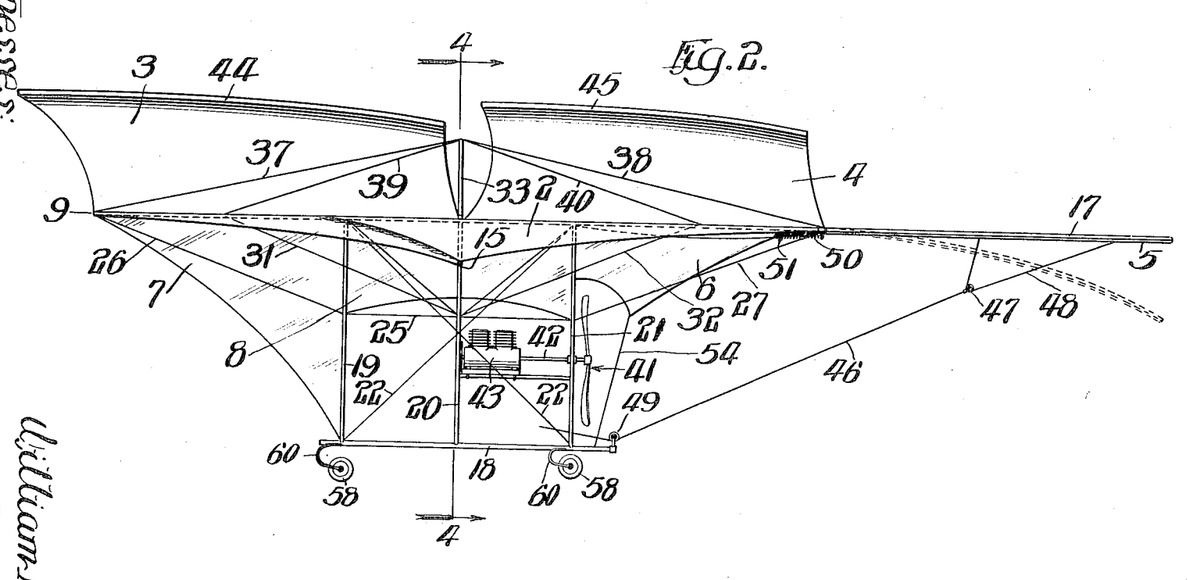
Fig. 2 is a view of the same in side elevation.
Figures 11, 12, 13:
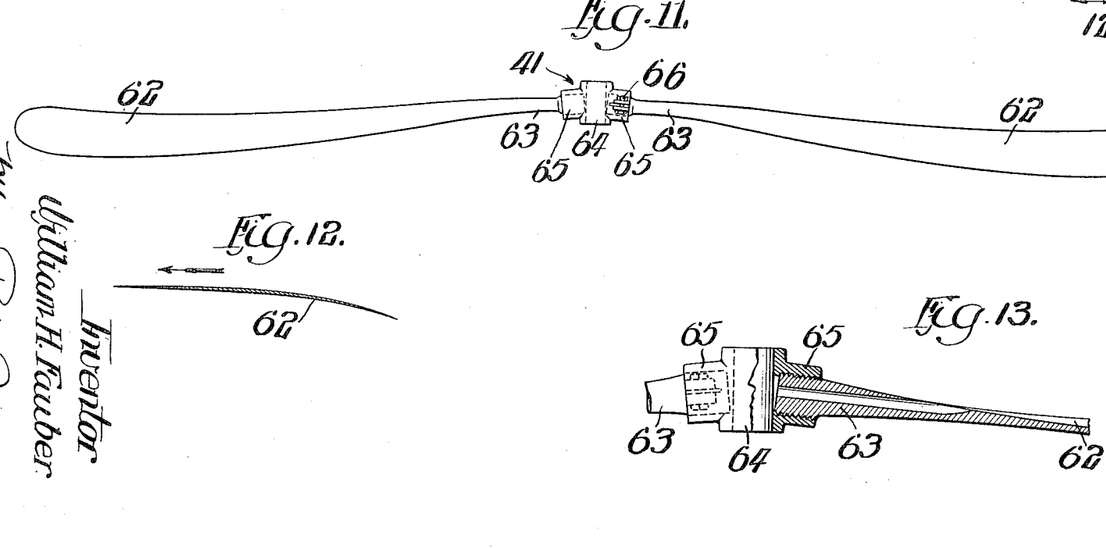
Fig. 11 is a side view of the propeller.
Fig. 12 is a sectional view of one of the propeller blades taken on line 12—12 of Fig. 10.
Fig. 13 is a detail section showing the connection between the propeller blades and shaft.

The propeller 41 embraces novel features of construction as follows: Said propeller has radially extending propeller blades 62, of which two are shown in the drawings. As illustrated, each blade has a cylindric shank 63, which is attached to the propeller shaft by means of a sleeve or hub 64 in which the said shaft is inserted and secured. Each blade and its shank will preferably be made of a single piece of nickel-steel or other material of high tensile strength and rigidity. The said blades 62 are connected with the propeller shaft at an angle to lines perpendicular to the longitudinal axis of the shaft, the blades being inclined outwardly and forwardly, as shown in Fig. 2 of the drawings. The thrust of the outer parts of the blades on the air will manifestly tend to bend or deflect said blades forwardly or reversely to the direction of the thrust, but if the blades be inclined forwardly, as shown, the centrifugal force generated by the high speed of the propeller will tend to straighten the blades or throw them to a position perpendicular to the central axis of the shaft and to thereby counteract the effect of the thrust and to a large degree relieve the shanks of the blades of the leverage due to such thrust. The inclined arrangement of the said blades thereby largely avoids the liability of fracture of the blades under the combined action of centrifugal force, bending and vibration, it being manifest that the centrifugal action which tends to throw the outer ends of the blades rearwardly will counteract the thrust of the blades which tends to bend them forward, to such extent as to practically relieve the shanks of the blades from strains tending to break them. The shanks 63 of the propeller blades are cylindric in form and tubular or hollow to give lightness combined with rigidity. By making the shanks of the blades cylindric and tubular, I avoid the use of ribs or reinforcing projections, which would otherwise be necessary to give strength and rigidity, but which would be objectionable because giving increased resistance to the rotation of the blades. As a means for detachably securing said blades to the propeller shaft, the hub 64 is provided with oppositely extending hollow nipples 65, which are internally screw threaded to receive the inner ends of the shanks of the blades, which are correspondingly screw threaded. The said nipples 65 are split or longitudinally slotted, and provided with clamping screws 66 by which the nipples may be drawn tightly around the inner ends of the shanks and the latter thereby securely held from turning. Said propeller blades are made of greatest width at their outer ends and tapered inwardly to the cylindric shanks thereof. This form in the blades affords the greatest effective surface or thrust area near the outer ends of the blades, where the speed of rotation is the highest. As a further improvement, I make the outer ends of the propeller blades transversely curved in shape with their concave sides facing rearwardly or in the direction of the thrust, as shown in Fig. 12. The advance edges of the blades are at a slight inclination to the path of rotation of the same, and the rear portions thereof have a gradually increasing curvature to their back or rear edges. The blades so curved not only operate more advantageously by reason of the curvature thereof, but the concave form thereof serves to stiffen the same and prevent bending or fracture thereof under the thrust of their outer ends against the air. The said blades have thin or sharp lateral, or forward and rear edges, adapted to lessen the resistance of the air in the rotation of the blades. The propeller blades made and arranged as described are particularly adapted to withstand the end thrust and vibrating effect due to the high speed at which the propeller of an aeroplane apparatus is driven, to withstand the torsional strains due to the impulses of a motor operating without a balance wheel, to withstand the tendency to elongation of the metal under the combined effects of centrifugal force and vibrations, to avoid unnecessary air resistance in rotation and to give maximum efficiency in end thrust. By reason of the forward inclination of the blades to their axis of rotation, the effect of the end thrust is counteracted by centrifugal force, as hereinbefore stated, so that the blades may be made light and thin, and without ribs or reinforcements which would act to retard movement. The gradually increasing curvature of the rear edge of the blade is of such proportion as to take up the slip, the front edge thereof being substantially flat, so that it will enter the air on the pitch line, and the curvature gradually increases toward the rear edge in a manner adapted to take up the slip and insure the effective action of the entire area of the blade. The lateral curvature, moreover, strengthens or stiffens the blade, enabling the same to be made very thin, with consequent decrease of air displacement and resistance, and lessened employment of unproductive power.

Figure 5:
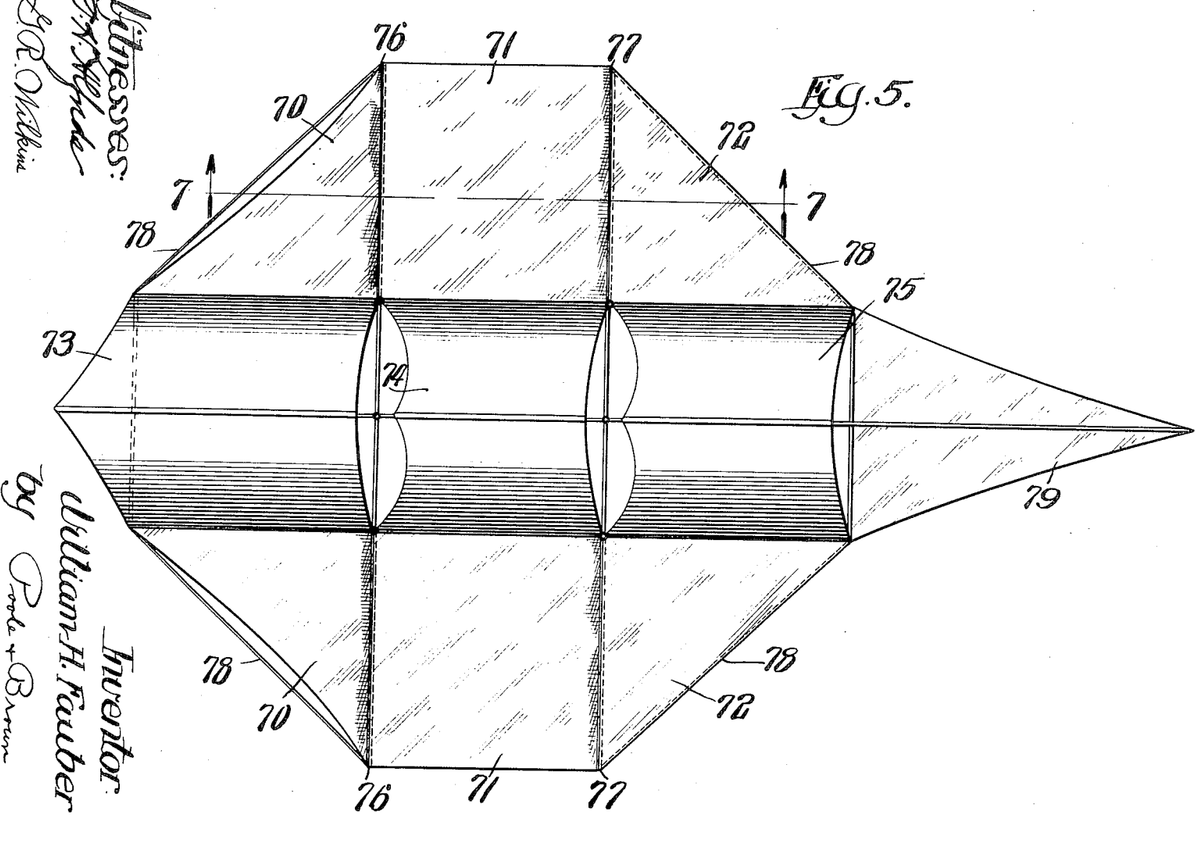
Fig. 5 is a plan view of a modified form of the apparatus.
Figure 7:
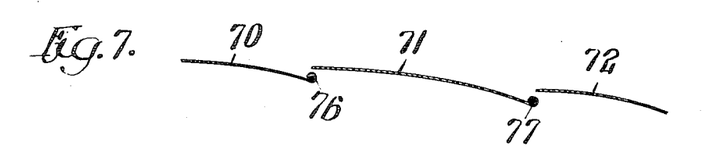
Fig. 7 is a like sectional view, taken on the line 7—7 of Fig. 5.
Figure 8:
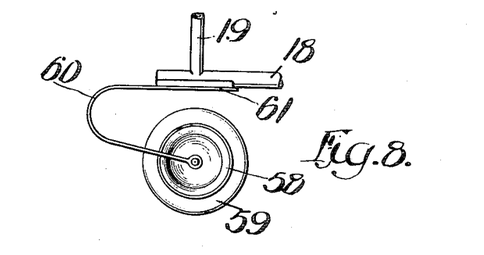
Fig. 8 is a detail, side elevation of one of the supporting wheels located at the bottom of the frame of the apparatus.
Figure 9:
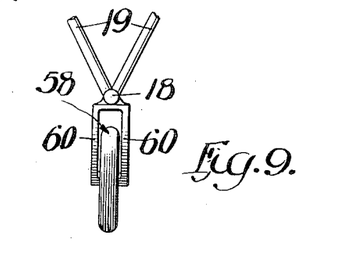
Fig. 9 is an end view of the parts shown in Fig. 8.
Figure 10:
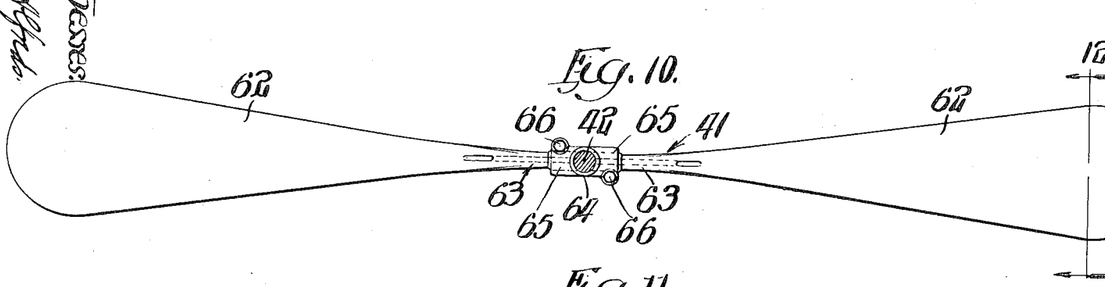
Fig. 10 is a detail view of the propeller, showing the propeller shaft in section.

In Fig. 5, I have shown a form of apparatus having at each side thereof three laterally projecting aeroplane members 70, 71 and 72, and along its center line three longitudinal, arched aeroplane members 73, 74 and 75. In this instance the forward and rear lateral members 70 and 72 are of triangular form, while the intermediate aeroplane member 71 is rectangular in shape. The said lateral aeroplane members 70, 71 and 72 are in this instance constructed substantially as hereinbefore described, the same being made of flexible material and connected at their rear margins with the framework in such manner that said rear margins are held from rising while their forward margins are slack and adapted under the upward pressure of air thereon to rise in a curved form, thereby affording spaces through which air may enter between the adjacent rear and forward margins of said members. Moreover, the rear parts of each of said members are curved downwardly, with gradually increasing curvature, as clearly shown in Fig. 7. As illustrated in the drawings, the rear transverse margins of the members 70 and 71 are secured to the lower faces of the parallel transversely extending frame members 76 and 77 while the rear margin of the rear triangular member 62 is attached to an oblique tension member or wire 78. The said rear margins of the said aeroplane members are thereby held from rising while the front margins thereof, being attached at their ends to the framework loosely or without being stretched taut, are adapted to rise in the manner hereinbefore described. The arched members 73, 74 and 75 will be downwardly inclined at their rear ends in the same manner as hereinbefore described in connection with the corresponding members 3 and 4 illustrated in Fig. 1. The apparatus shown in said Fig. 5 has a triangular, horizontal rudder 79, and may be otherwise constructed as illustrated in the figures of the drawing hereinbefore described.

An important feature of my invention is embraced in a construction which includes a plurality of aeroplane members or sections disposed in the same general horizontal plane, one at the rear of another, with the forward margin of each member or section above the level of its rear margin, or of the rear margin of a member located in advance of it. This construction affords in the aeroplane as a whole a large extent of aeroplane surface in a direction from front to rear of the apparatus, and a correspondingly large area or extent of supporting surface adapted to give parachute action. In prior aeroplane apparatus having parallel aeroplane members which are vertically separated from each other and of narrow dimensions from front to rear, a very small amount of parachute action is afforded to sustain the apparatus in case the propelling apparatus be disabled, so that in case the rapid forward movement of the apparatus ceases such forward movement may easily change to a perilous downward plunge. As compared with such prior apparatus the arrangement of parts illustrated, by which the aeroplane members are disposed in substantially the same horizontal plane and in a manner to give extended longitudinal dimension to the sustaining surface as a whole, and large parachute area, affords important advantages in safety and stability, with superior lifting or sustaining effect.

An important advantage is gained in making the aeroplane members with a downward curve at the rear margins thereof for the reason that the lifting or deflecting effect is greater with such curved surface than with the flat or plane surfaces relatively to the horizontal power exerted or propelling force employed. The downward curved rudder 5, as well as the aeroplane members 1, 2, 3 and 4 equally constitute aeroplanes in the general sense of that term and I therefore desire to cover aeroplanes or supporting members when made of such downward curve form at their rear parts or margins, whether such supporting members be employed as a horizontal rudder or as the main supporting member or members of an aeroplane apparatus. The superior lifting effect afforded by an aeroplane member which is downwardly curved at its rear part with a gradually increasing curvature may be understood from consideration of the fact that a plane surface advancing through the air at an angle to its line of motion and at a high speed produces the greatest lifting power near its front edge. The reason for this is that, as the forward edge of a plane surface advances over a body of undisturbed air, it tends to displace, in a downward direction, the body of air just beneath it, the lifting effect produced being due to the fact that such body of air will be started in movement so slowly that its part in immediate contact with the plane is compressed to such extent as to exert an upward or resisting pressure on the plane. As the rear part of the plane advances over this body of air which has been acted on by the forward part of the plane, and which has been deflected or started in motion downwardly, such body of air can act with little upward pressure on the rear portion of the plane. If, therefore, a flat plane be made of considerable width from front to rear, its rear portion will always be advancing over a body of air that has already been started in downward motion by the action of the forward part of the plane, and there is little further sustaining effect to be derived from it. If, however, instead of a plane surface, a surface be employed which is downwardly curved toward its rear margin, with a gradually increased curvature, the rear part of the curved surface continually presents to the body of air, parts which are progressively lower, and which continue to exert downward pressure on such body of air, notwithstanding the fact that such body of air has been started downwardly. In other words, such a curved surface acts throughout its entire area on the air beneath it in a manner to give continued downward pressure and further downward movement or displacement of the air, so that the entire area of the surface is effective to give downward pressure upon the air and consequent sustaining effect.

I claim as my invention:

1. An apparatus for aerial navigation comprising a central longitudinal aeroplane member and a plurality of lateral aeroplane members located in a substantially horizontal plane at the sides of said central longitudinal member, and arranged one at the rear of another, with their forward edges above the level of their rear edges, the central aeroplane member having its lateral margins adjacent to the inner edges of said lateral aeroplane members and extending at its central portion above the level of said lateral aeroplane members.

2. An apparatus for aerial navigation comprising a central longitudinal aeroplane member and a plurality of substantially horizontal, lateral aeroplane members located at the sides of said central longitudinal member and arranged one at the rear of another, with their forward edges above the level of the rear edges, and having their rear portions downwardly curved, said central supporting member having its lateral margins adjacent to the inner edges of said lateral supporting members and extending at its central portion above the level of said lateral supporting members.

3. In an apparatus for aerial navigation, the combination with a central longitudinal aeroplane member and a plurality of substantially horizontal, lateral aeroplane members located at the sides of said central, longitudinal member, and arranged one at the rear of another with their forward edges above the level of their rear edges, and having their rear portions downwardly curved with a gradually increasing curvature toward the rear, said central, longitudinal member having its lateral margins adjacent to the inner edges of said lateral aeroplane members and extending at its central portion above the level of said lateral supporting members.

4. An apparatus for aerial navigation comprising a central, longitudinal arched, collapsible aeroplane member, and a plurality of lateral aeroplane members located in a substantially horizontal plane, at the sides of said central longitudinal member and arranged one at the rear of another, with their forward edges above the level of their rear edges.

5. An apparatus for aerial navigation comprising a horizontal frame work, a central, longitudinal aeroplane member, of flexible material, connected at its side margins with said frame work, and a plurality of substantially horizontal, lateral aeroplane members of flexible material, applied to said frame work at the sides of said central, longitudinal member and arranged one at the rear of another with their forward edges above the level of their rear edges, said lateral members being downwardly curved from their front to their rear edges.

6. In an apparatus for aerial navigation comprising a horizontal frame work, a central, longitudinal supporting member of flexible material connected at its side margins to and rising in arched form above said frame work, and a plurality of substantially horizontal, lateral aeroplane members of flexible material applied to said frame work at the sides of said central, longitudinal member and arranged one at the rear of another with their forward edges above the level of their rear edges, said members being downwardly curved from their forward to their rear edges.

7. An apparatus for aerial navigation comprising a horizontal frame-work, and a plurality of aeroplane members of flexible material applied to said frame-work, one at the rear of another, the said flexible members being attached along their rear margins to the frame-work and having their forward margins disconnected from the frame-work, so that said forward margins are left free to rise in bowed form between their ends under upward air pressure.

8. An apparatus for aerial navigation comprising a horizontal frame-work provided with two parallel longitudinal frame-members, and with transverse frame members extending laterally outward from said longitudinal frame members, and two aeroplane members of flexible sheet material applied to the frame-work at each side thereof, said members being connected at their inner margins with the said longitudinal frame members and at their outer angles to the outer ends of the transverse frame members, with the forward edge of the rearmost member above the level of the rear edge of the forward member.

9. An apparatus for aerial navigation comprising a horizontally disposed framework provided with two parallel longitudinal frame members, with transverse frame members extending outwardly from said longitudinal frame members, and with tension members extending from the outer ends of said transverse frame members to the said longitudinal frame members, and a plurality of aeroplane members of flexible sheet material applied to each side of the said frame-work, said aeroplane members being connected at their inner margins with said longitudinal frame members and at their outer angles to the outer ends of the transverse frame members, and the forward edges of the rear aeroplane member being located above the level of the rear edges of the forward aeroplane members.

10. An apparatus for aerial navigation comprising a horizontally disposed framework provided with two parallel longitudinal frame members, with transverse frame members extending outwardly from said longitudinal frame members, and with tension members extending from the outer ends of said transverse frame members to the said longitudinal frame members, and a plurality of aeroplane members of flexible sheet material applied to each side of the said frame work, said aeroplane members being connected at their inner margins with the said longitudinal frame members and at their outer angles to the outer ends of the transverse frame members, and the rear margins of the forward aeroplane member being attached to said transverse frame members, and the rear edges of the rearmost aeroplane members being attached to the tension members which extend rearwardly from said transverse frame members.

11. An apparatus for aerial navigation comprising a central, longitudinal supporting member of arched form, substantially horizontal, lateral aeroplane members separated from each other by a central space extending in the direction of flight, said central supporting member being located between and rising above the level of said lateral aeroplane members, the front edge of the rear supporting member being located above the level of the rear edge of the forward supporting member.

12. An apparatus for aerial navigation comprising substantially horizontal, lateral aeroplane members and two central, longitudinally arranged supporting members of arched form located between and rising above said lateral aeroplane members, the upper portions of said central, arched supporting members being downwardly curved at their rear parts.

13. An apparatus for aerial navigation comprising substantially horizontal, lateral aeroplane members, and central, longitudinally arranged supporting members of arched form located between and rising above said lateral aeroplane members, the aeroplane members at each side of the apparatus embracing a plurality of members, one located at the rear of the other, with their forward edges above the level of their rear edges and the forward edges of the arched supporting members being located above the level of the rear edges thereof.

14. An apparatus for aerial navigation comprising substantially horizontal lateral aeroplane members, and a plurality of central, longitudinally arranged supporting members of arched form located between and rising above said lateral aeroplane members, the aeroplane members at each side of the apparatus embracing a plurality of members, located one at the rear of another, both said lateral aeroplane members and arched central supporting members being downwardly curved at their rear ends.

15. An apparatus for aerial navigation comprising a horizontally disposed framework provided with two parallel longitudinal frame members, and with transverse frame members which extend outwardly from said longitudinal frame members, a plurality of longitudinally arranged, central arched supporting members, connected at their side margins with the said longitudinal frame members, and a plurality of aeroplane members of flexible material applied to the said frame at each side of said central longitudinal supporting members, with the forward edges of the rearmost aeroplane members located above the level of the rear edges of the forward aeroplane members.

16. An apparatus for aerial navigation comprising a horizontally disposed frame-work provided with two parallel longitudinal frame members, and with transverse frame members which extend outwardly from said longitudinal frame members, a plurality of longitudinally arranged, central, arched supporting members, connected at their side margins with the said longitudinal frame members, a plurality of aeroplane members of flexible material applied to the said frame at each side of said central longitudinally supporting members, said central, arched, longitudinal supporting members and lateral aeroplane members being downwardly curved at their rear parts.

17. An apparatus for aerial navigation comprising an upper horizontally disposed frame-work provided with a central, longitudinal frame member, with two lateral longitudinal frame members, with transverse frame members connecting the said longitudinal frame members with each other at their forward and rear ends, and with other transverse frame members attached to said central and lateral frame members and extending outwardly from said lateral frame members, a central, arched supporting member connected at its side margins with said lateral, longitudinal frame members, aeroplane members of flexible material applied to said horizontally disposed frame-work outside of the lateral, longitudinal frame members and a lower frame-work comprising a centrally arranged, longitudinal keel member, centrally arranged upright rigid frame members attached to and extending downwardly from the said central longitudinal frame members of the upper frame-work, and inclined, rigid frame members extending upwardly from the said central longitudinal keel member to the lateral longitudinal frame members of the upper frame-work.

18. An apparatus for aerial navigation comprising an upper, horizontally disposed frame-work, provided with a central, longitudinal frame member, with two lateral longitudinal frame members and with transverse frame members extending outwardly from said lateral, longitudinal frame members, a central, arched supporting member connected at its side margins with said lateral, longitudinal frame members, aeroplane members of flexible material applied to said horizontally disposed frame-work outside of said lateral longitudinal frame members, a lower frame-work comprising a centrally arranged, longitudinal keel member, a centrally arranged, upright, rigid frame member attached to and extending downwardly from said central, longitudinal frame member of the upper frame-work forward of the rear end of the latter, inclined rigid frame members extending from said central keel member to the lateral, longitudinal frame members of the upper frame-work, a motor mounted on the lower frame-work, a propeller mounted on said lower frame-work and located at the rear of said upright frame member, below the upper frame-work and forward of the rear end of the latter, an upright steering rudder located below the upper frame-work, with its forward part extending over the propeller, and having its forward margin connected with the said upright frame member, and a horizontal rudder located at the level of the upper frame-work, at the rear of the propeller, and connected at its forward edge with the rear end of said frame-work.

19. An apparatus for aerial navigation comprising an upper, horizontally disposed frame-work, aeroplane members applied thereto, a horizontal rudder extending rearwardly from said upper frame-work, a lower frame-work depending from the upper frame-work, a propeller carried by said lower frame-work at the rear of the latter, a vertical steering rudder of flexible material located beneath the said upper frame-work in advance of the said horizontal rudder, said steering rudder consisting of a flexible sheet of triangular form, having an upright forward edge which is connected with the lower frame-work, and a rearwardly directed point or angle, steering ropes connected with the said point or angle of the rudder for shifting or moving the same laterally, and a cord connected with the lower margin of said flexible rudder and extending downwardly to the lower part of said lower frame at the rear of the propeller.

20. An apparatus for aerial navigation comprising an upper, horizontally disposed frame work provided with two longitudinal, laterally separated frame members and with a central, longitudinal frame member, aeroplane members attached to the said frame work outside of said laterally separated frame member, a central supporting member connected with and extending between said laterally separated frame members, and a central, vertical, longitudinally arranged balancing sail attached at its upper edge to and extending downwardly from said central longitudinal member of the frame work.

21. An apparatus for aerial navigation comprising an upper, horizontally disposed frame work provided with two longitudinal, laterally separated frame members and with a central, longitudinal frame member, aeroplane members attached to the said frame work outside of said laterally separated frame member, a central, arched supporting member of flexible material connected at its side margins with said laterally separated, longitudinal frame members, and a central, vertically arranged balancing sail attached to and extending downwardly from said central, longitudinal frame member.

22. An apparatus for aerial navigation comprising an upper, horizontally disposed frame work provided with two longitudinal, laterally separated frame members and a central, longitudinal frame member, aeroplane members attached to said upper frame work and extending outwardly from said laterally separated, longitudinal frame members, a central, supporting member attached at its side margins to and extending between said laterally separated, longitudinal frame members, a lower frame work depending from said upper frame work, and a central, vertical, longitudinal balancing sail connected at its upper margin with the said central, longitudinal member of the upper frame work and attached at its lower margin to the said lower frame work.

23. An apparatus for aerial navigation comprising an upper, horizontally disposed frame work provided with two main, longitudinal, laterally separated frame members, and a central longitudinal frame member, aeroplane members attached to said upper frame work, a lower frame work embracing a longitudinal keel member, and a central, upright, rigid member extending from said keel member upwardly to said central, longitudinal member of the upper frame work, and a balancing sail of triangular form attached at its upper edge to said central, longitudinal frame member of the upper frame work and at its rear margin to the said upright member.

24. An apparatus for aerial navigation comprising an upper, horizontally disposed frame work provided with two main, longitudinal, laterally separated frame members, and a central longitudinal frame member, aeroplane members attached to said upper frame work, a lower frame work embracing a longitudinal keel member, and two upright, rigid members extending from said keel member upwardly to said central, longitudinal member of the upper frame work, a balancing sail connected with the said central, longitudinal frame member and the forward, upright frame member, and a steering rudder connected at its forward edge with and extending rearwardly from the rear upright member.

25. An apparatus for aerial navigation comprising an upper, horizontally disposed frame work provided with two main, longitudinal, laterally separated frame members and a central, longitudinal frame member, aeroplane members attached to said frame work, a lower frame work embracing a longitudinal keel member, and two upright, rigid members extending from said keel members upwardly to the central longitudinal member of the upper frame work, a vertical, longitudinally arranged balancing sail of triangular form located at the forward end of the apparatus and connected at its upper margin with said central, longitudinal member of the upper frame work and at its rear margin with the forward, upright frame member, and a second balancing sail extending from front to rear and attached at its forward and rear edges to the forward and rear upright frame members.

26. An apparatus for aerial navigation comprising an upper, horizontally disposed frame work provided with two main, longitudinal, laterally separated frame members and a central, longitudinal frame member, aeroplane members attached to said frame work, a lower frame work embracing a longitudinal keel member, and two upright, rigid members extending from said keel member upwardly to the central longitudinal member of the upper frame work, a vertical, longitudinally arranged balancing sail of triangular form located at the forward end of the apparatus and connected at its upper margin with said central, longitudinal member of the upper frame work and at its rear margin with the forward, upright frame member, a second balancing sail extending from front to rear between said forward and rear upright frame members and attached at its upper margin to the said central, longitudinal frame member of the upper frame work.

27. An apparatus for aerial navigation comprising an upper, horizontally disposed frame work provided with two main, longitudinal, laterally separated frame members and a central, longitudinal frame member, aeroplane members attached to said frame work, a lower frame work embracing a longitudinal keel member, and two upright, rigid members extending from said keel member upwardly to the central longitudinal member of the upper frame work, a vertical, longitudinally arranged balancing sail of triangular form located at the forward end of the apparatus and connected at its upper margin with said central, longitudinal member of the upper frame work and at its rear margin with the forward, upright frame member, a second balancing sail extending from front to rear between said forward and rear, upright frame members, and a steering rudder attached at its forward margin to and extending rearwardly from the rear upright frame member.

28. An apparatus for aerial navigation comprising a frame-work, aeroplane members attached to said frame-work and a supporting wheel located below the bottom of the frame-work, said wheel being provided with a pneumatic tire, and a flexible arm connecting said wheel with the frame-work, said frame-work being provided with a downwardly facing bearing surface located above the said wheel.

In testimony, that I claim the foregoing as my invention I affix my signature in the presence of two witnesses, this 30th day of September A. D. 1908.

WILLIAM H. FAUBER.

Witnesses:
H. C. COXE,
JOHN BAKER.